United States Patent
Salsac et al.

(12)

(10) Patent No.: US 12,458,494 B2
(45) Date of Patent: Nov. 4, 2025

(54) HEART VALVE IMPLANT

(71) Applicants: UNIVERSITE TECHNOLOGIE DE COMPIEGNE, Compiegne (FR); UNIVERSITE PARIS EST CRETEIL VAL DE MARNE, Creteil (FR); ASSISTANCE PUBLIQUE—HOPITAUX DE PARIS, Paris (FR); INSTITUT NATIONAL DE LA SANTE ET DE LA RECHERCHE MEDICALE (INSERM), Paris (FR); CENTRE NATIONAL DE LA RECHERCHE SCIENTIFIQUE (CNRS), Paris (FR)

(72) Inventors: Anne-Virginie Salsac, Choisy-Au-Bac (FR); Adrien Laperrousaz, Perrignier (FR); Eric Bergoend, Saint Maur des Fosses (FR); Jean-Paul Couetil, Vaucresson (FR)

(73) Assignees: UNIVERSITE TECHNOLOGIE DE COMPIEGNE, Compiegne (FR); UNIVERSITE PARIS EST CRETEIL VAL DE MARNE, Creitel (FR); ASSISTANCE PUBLIQUE—HOPITAUX DE PARIS, Paris (FR); INSTITUT NATIONAL DE LA SANTE ET DE LA RECHERCHE MEDICALE (INSERM), Paris (FR); CENTRAL NATIONAL DE LA RECHERCE SCIENTIFIQUE (CNRS), Paris (FR)

( * ) Notice: Subject to any disclaimer, the term of this patent is extended or adjusted under 35 U.S.C. 154(b) by 1194 days.

(21) Appl. No.: 17/275,428

(22) PCT Filed: Sep. 13, 2019

(86) PCT No.: PCT/EP2019/074477
§ 371 (c)(1),
(2) Date: Dec. 10, 2021

(87) PCT Pub. No.: WO2020/053384
PCT Pub. Date: Mar. 19, 2020

(65) Prior Publication Data
US 2022/0151780 A1    May 19, 2022

(30) Foreign Application Priority Data

Sep. 13, 2018    (FR) ..................................... 1858233

(51) Int. Cl.
*A61F 2/24*        (2006.01)

(52) U.S. Cl.
CPC ............ *A61F 2/2433* (2013.01); *A61F 2/246* (2013.01); *A61F 2/2463* (2013.01); *A61F 2/2427* (2013.01);
(Continued)

(58) Field of Classification Search
None
See application file for complete search history.

(56) References Cited

U.S. PATENT DOCUMENTS 10,973,639 B2 * 4/2021 Metchik ................... A61F 2/246
11,207,181 B2 * 12/2021 Freschauf ............... A61F 2/246
(Continued)

FOREIGN PATENT DOCUMENTS

| CN | 102639179 | 8/2012 |
|----|-----------|--------|
| CN | 202859228 | 4/2013 |

(Continued)

OTHER PUBLICATIONS

Chinese Office Action in related Chinese Application No. 201980074270.8, mailed Jun. 28, 2024 (With English Translation.
(Continued)

*Primary Examiner* — Megan Y Wolf
(74) *Attorney, Agent, or Firm* — Thomas | Horstemeyer, LLP

(57) ABSTRACT

Implant (10) for a heart valve comprising two leaflets, particularly a mitral valve (MV), the implant (10) compris-
(Continued)

ing: a clamp (11) comprising a body (13) and a jaw (14) rotationally hinged with the body (13) to pivot between an open position and a closed position in which the body (13) and the jaw (14) are able to clamp a first leaflet among the heart valve leaflets, so as to attach the implant (10) onto the first leaflet, a movement device (41, 42) comprising a pusher element (41), the movement device being configured to move the jaw (14) relative to the body (13) from the open position to the closed position or vice versa, when the pusher element (41) is pushed by a rod (101), and a balloon (12) attached to the clamp (11) and configured to close at least partially an open portion (O1) remaining between the heart valve (MV) leaflets during systole, when the implant (10) is attached to the first leaflet, so as to limit a reflux of blood through said open portion (O1) remaining during systole.

12 Claims, 15 Drawing Sheets

(52) U.S. Cl.
CPC .................. *A61F 2210/0014* (2013.01); *A61F 2220/0016* (2013.01); *A61F 2220/0091* (2013.01); *A61F 2250/0003* (2013.01)

(56) References Cited

U.S. PATENT DOCUMENTS

| | | | |
|---|---|---|---|
| 2006/0058871 A1 | 3/2006 | Zakay | |
| 2007/0198082 A1 | 8/2007 | Kapadia | |
| 2011/0066233 A1 | 3/2011 | Thornton | |
| 2014/0067054 A1* | 3/2014 | Chau | A61F 2/2454 |
| | | | 623/2.36 |
| 2018/0325663 A1* | 11/2018 | Taylor | A61F 2/2412 |
| 2019/0060072 A1* | 2/2019 | Zeng | A61F 2/2463 |
| 2019/0167429 A1* | 6/2019 | Stearns | A61F 2/2466 |
| 2021/0022850 A1* | 1/2021 | Basude | A61F 2/2466 |
| 2021/0338418 A1* | 11/2021 | Feld | A61F 2/2463 |

FOREIGN PATENT DOCUMENTS

| | | |
|---|---|---|
| CN | 103997990 | 8/2014 |
| CN | 105246431 | 1/2016 |
| CN | 105473107 | 4/2016 |
| CN | 107106176 | 8/2017 |
| CN | 107847323 | 3/2018 |

OTHER PUBLICATIONS

Feldman, Ted, et al., "Percutaneous Repair or Surgery for Mitral Regurgitation", The New English Journal of Medcine, vol. 364, No. 15, Apr. 14, 2011, pp. 1395-1406.

* cited by examiner

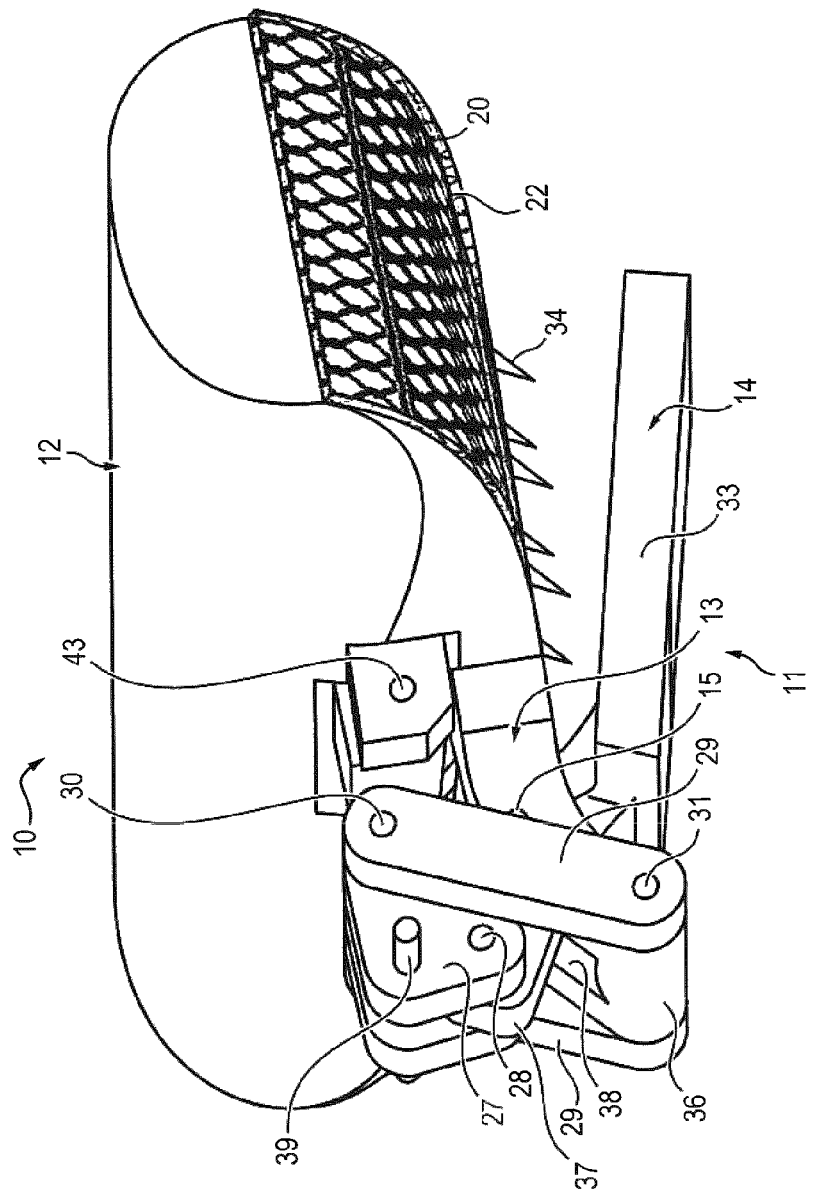

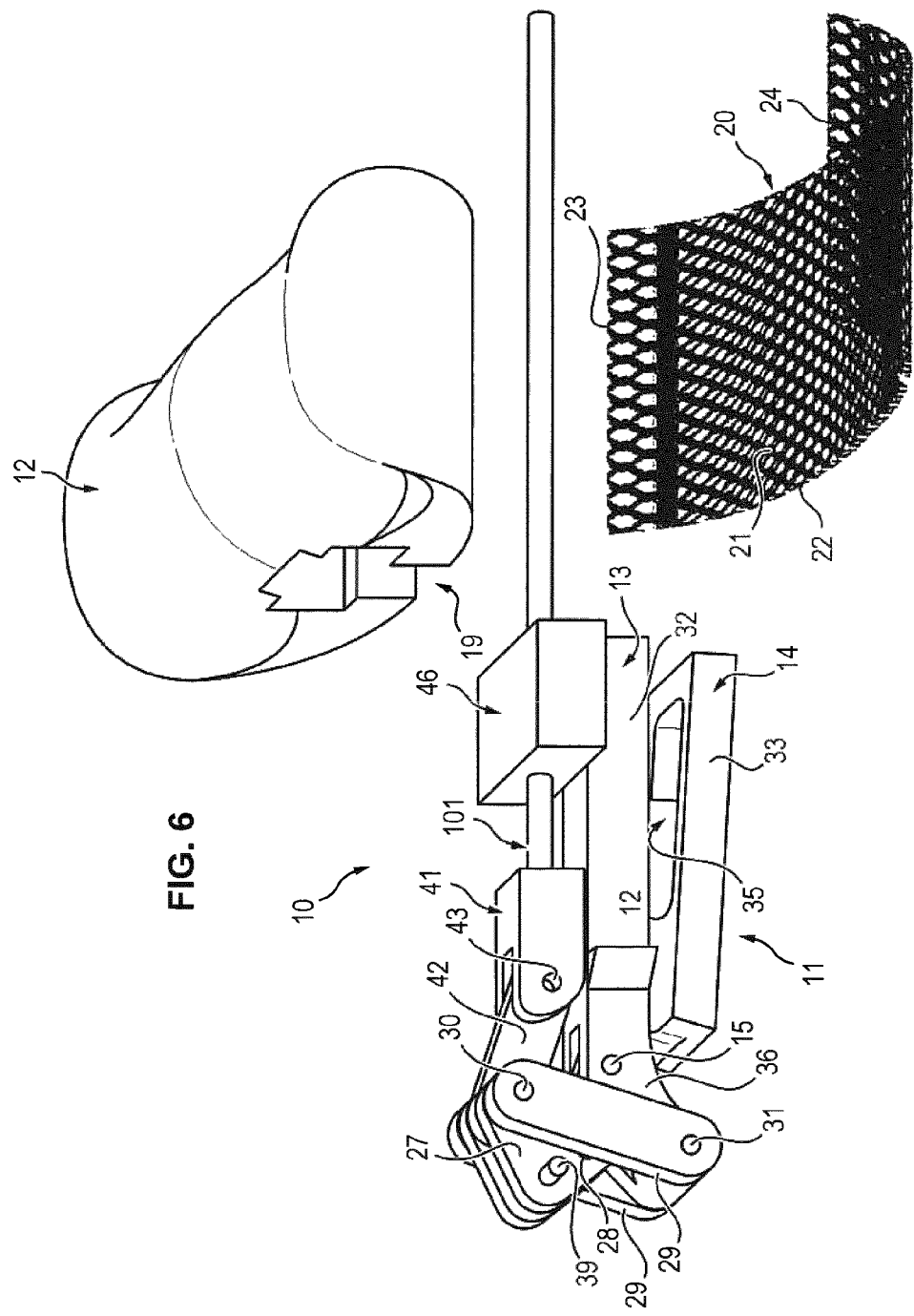

HEART VALVE IMPLANT

GENERAL TECHNICAL FIELD

The present invention concerns a heart implant for treating valvular leaks. It is particularly suited for the treatment of mitral regurgitation in a patient, but its use can be extended to heart valves other than the mitral valve. More precisely, the invention concerns an implant that can be implanted percutaneously and apposed onto one of the leaflets of the heart valve to be treated.

STATE OF THE ART

FIG. 1 shows a patient's heart. It comprises a left ventricle LV separated from the left atrium LA by the mitral valve MV. When the left ventricle LV contracts (systole), the left atrium LA fills with oxygenated blood originating from pulmonary veins PV, the mitral valve MV being then closed. Then the left ventricle LV relaxes (diastole). The mitral valve MV opens and the blood goes from the left atrium LA to the left ventricle LV. Then this ventricle contracts, opening the aortic valve AV and closing the mitral valve MV, in order to eject the oxygenated blood into aorta A, to the rest of the body.

As illustrated in FIGS. 2a and 2b, the mitral valve MV is made up of a mitral annulus MA that defines the opening between the left atrium LA and the left ventricle LV, of a posterior leaflet PL and an anterior leaflet AL. The posterior leaflet PL and anterior leaflet AL extend, respectively, from the posterior part and from the anterior part of the mitral annulus MA. The mitral subvalvular apparatus, MSVA, is formed of cordae tendineae connecting the posterior leaflet PL and anterior leaflet AL to the wall of left ventricle LV by means of the papillary muscles.

FIGS. 2a and 2b respectively illustrate, in top view, a healthy mitral valve MV during diastole and during systole. During diastole, the anterior and posterior leaflets AL and PL of the mitral valve MV separate from each other, allowing blood to flow from the left atrium LA to the left ventricle LV. During systole, the anterior and posterior leaflets AL and PL of mitral valve MV come into contact with one another, so as to close the passage between the left ventricle LV and the atrium LA, thus ensuring coaptation and preventing any reflux of blood from the left ventricle LV to the left atrium LA.

FIGS. 3a and 3b illustrate, in top view, a mitral valve MV of a patient with mitral regurgitation, respectively during diastole (relaxation movement of the heart) and systole (contraction movement of the heart). In FIG. 3b, one can see that a part of the posterior leaflet PL is not able to come into contact with the anterior leaflet AL during systole. The mitral valve MV does not correctly close, which induces regurgitation—reflux—of blood from the left ventricle LV to the left atrium LA. The flow of blood sent by the heart to the rest of the body is decreased as a result.

Such regurgitation, called mitral regurgitation, is generally accompanied by dilatation of the left ventricle LV. This dilatation leads to an increase in the diameter of mitral annulus MA, which induces a still greater deviation between the posterior leaflet PL and the anterior leaflet AL during systole, and therefore further increases mitral regurgitation (thereby creating a vicious circle).

Apart from cardiac medical treatment, the standard treatment for this pathology consists of surgical valve repair or replacement. When this pathology is secondary to cardiomyopathy (secondary or functional mitral regurgitation), a surgical procedure presents a non-negligible risk, due to the associated cardiomyopathy, other associated health problems or the advanced age of the patient.

Several percutaneous solutions to treat mitral regurgitation have thus been proposed in order to limit the invasive nature of the procedure.

Document US 2003/0130571 describes a system for mitral valve repair by means of which the free edges of the anterior and posterior leaflets are stapled together at their central part to ensure complete closure of the mitral valve during systole. During diastole, the opening formed between the anterior and posterior leaflets stapled at their middle has the form of a bow tie.

To repair the mitral valve in this way, the system proposed in this document comprises a guide, a hollow rod provided with clamps and a catheter at the end of which extends an inflatable balloon, and a staple. The guide is first inserted into the left ventricle up to the left atrium by means of a valve created beforehand in the left ventricle wall at its apex. Then, the rod is slid along the guide until the clamps are positioned in the left atrium. The guide is then withdrawn and the clamps are opened in the left atrium so as to position the free edges of the anterior and posterior leaflets facing the apex of the left ventricle and hold them in this position, called the gripping position. The catheter is then slid along the inside of the rod, until the balloon is positioned in the left atrium, where it is inflated. The clamps are then slid into the left ventricle, while the balloon holds the free edges of the anterior and posterior leaflets in the gripping position, and the clamps come to clamp said free edges. Finally, the staple is conveyed along the inside of the rod toward the free edges of the anterior and posterior leaflets clamped by the clamps, until they are attached together at their central part.

Such a mitral valve repair, notably the placement of the implant, requires a surgical procedure including a thoracotomy, which increases the risks of the procedure.

Another solution is proposed in document WO 2008/141322. This document describes an implant for mitral valve repair that can be implanted transapically. This implant comprises a rod at a first end of which an anchoring portion is extended, intended to be inserted into the myocardial apex, and at a second end of which a balloon is deployed, intended to come into contact with the anterior and posterior leaflets of the mitral valve, during systole, thus preventing any reflux of blood between the left ventricle and left atrium. This device increases the coaptation surface between the valvular leaflets. For this, the balloon slides freely in the rod. During systole, the pressure difference between the left ventricle LV and the left atrium LA causes the balloon to move up to the left atrium LA. It is then positioned between the two valvular leaflets and decreases valvular regurgitation in systole. The balloon can be inflated, which allows it to be implanted percutaneously in a folded condition. The balloon is deployed once the implant is correctly positioned in the patient's heart.

However, in the current state, this solution can only be implemented transthoracically and not percutaneously.

Document US 2014/0236198 further proposes another alternative solution to the one described in document US 2003/0130571, in which the free edges of the anterior and posterior leaflets of the mitral valve are also stapled together at their central part, so that, during diastole, the opening formed between said anterior and posterior leaflets has the shape of a bow tie. However, in this document, the mitral valve can be repaired percutaneously. For this, the proposed device comprises a rod at the end of which a staple is fastened removably. The staple has a pair of distal arms and a pair of proximal arms, the arms of each of the pairs being arranged in radial opposition. When the device is inserted into the patient's vascular system, the arms of each pair of the staple are folded and extend along the rod. Once the staple is conveyed to the mitral valve, the arms are deployed so that a first set of proximal and distal arms clamps the anterior leaflet, while the second set of proximal and distal arms clamps the posterior leaflet, thus fastening the anterior and posterior leaflets together at their central part. The rod and the staple can then be detached and the rod removed.

Compared to the solution proposed in document US 2003/0130571, this solution has the advantage of allowing percutaneous implementation, thus limiting the risks of the procedure.

However, as for the solution proposed in document US 2003/0130571, calcification of the anterior and posterior leaflets limits the efficacy of such a stapling of the mitral valve leaflets.

Document U.S. Pat. No. 9,510,948 also proposes an implant comprising a clamp that can clamp a heart valve leaflet. To bring this implant close to the heart valve, a delivery device separate from the implant (illustrated in FIG. 12A of U.S. Pat. No. 9,510,948) is used. The delivery device comprises a rod, and a second clamp mounted on the rod (separate from the clamp of the implant itself). The implant is clamped by the jaws of the second clamp. Once the implant is close, the implant is released from the second clamp. However, this implant has the disadvantage of being difficult to position by maneuvering the rod remotely. In particular, the release of the implant from the clamp of the delivery device is difficult to perform.

Document WO2007/078772 also proposed a device to help treat blood regurgitation through a heart valve. The proposed implant has an occluding element, particularly a balloon, configured to be placed in the mitral valve, such that at least part of the occluding element is near the heart valve. A suspension wire allows positioning the occluding element in the heart valve. The suspension wire comprises an attachment part to attach the suspension wire to the heart wall surrounding the heart chamber containing the heart valve. The balloon is then situated between the two leaflets. However, the attachment of this suspension wire by the attaching element is not trivial to manipulate, and the occluding element; the balloon is not easy to position in the exact place where the regurgitation of blood is found. The efficacy of this device is therefore limited.

Document U.S. Pat. No. 14,577,852 is also known. This document teaches an implant, particularly for the mitral valve, used in the treatment of mitral regurgitation. More precisely, this document describes a mitral clip, serving to bring the two leaflets of the mitral valve together when the implant is attached onto the first leaflet of said valve. However, the closeness of the two leaflets is sometimes not sufficient to prevent any regurgitation of blood.

There is therefore a need to offer a mitral valve implant making it possible to obtain effective repair of the mitral valve and that can be implanted more easily and with a minimum of risk for the patient.

PRESENTATION OF THE INVENTION

More precisely, the present invention responds to this problem by proposing, according to a first aspect, an implant for a heart valve comprising two leaflets, particularly a mitral valve, the implant comprising:
- a clamp comprising a body and a jaw rotationally hinged with the body to pivot between an open position and a closed position in which the body and the jaw are able to clamp a first leaflet among the heart valve leaflets, so as to attach the implant onto the first leaflet,
- a movement device comprising a pusher element, the movement device being configured to move the jaw relative to the body from the open position to the closed position or vice versa, when the pusher element is pushed by a rod.
- a balloon attached to the clamp and configured to close at least partially an open portion remaining between the heart valve leaflets during systole, when the implant is attached to the first leaflet, so as to limit a reflux of blood through said open portion remaining during systole.

The implant according to the first aspect of the invention can further comprise the following optional features, taken alone or in combination when technically possible.

Preferably, the implant is configured to be inserted into a main catheter 100 so as to be implanted percutaneously or transapically.

Preferably, the balloon is inflatable.

Preferably, the balloon has a generally elongated shape extending along a transverse axis parallel to the first axis of rotation.

Preferably, the balloon has a first face arranged facing the clamp, said first face being convex between each of the ends of the balloon along the transverse axis.

Preferably, the implant comprises a support tab attached to the balloon, said support tab comprising a shape memory material exhibiting, in a first temperature range, a first shape state in which the support tab is folded back and, in a second temperature range, a second shape state in which the support tab is deployed.

Preferably, the clamp comprises a locking device configured to lock the clamp in the closed position, and the movement device is configured to act on the locking device so that the jaw is locked in closed position when the movement device moves the jaw relative to the body into the closed position.

Preferably, the locking device comprises a toggle.

Preferably, the jaw is rotationally hinged around a first axis of rotation relative to the body, and in which the clamp comprises a connecting rod rotationally hinged with the jaw around a second axis of rotation, said second axis of rotation being parallel with the first axis of rotation, in which the clamp comprises at least one rocker element rotationally hinged with the connecting rod around a third axis of rotation, on the one hand, and with the body of the clamp around a fourth axis of rotation, on the other hand, the third and fourth axes of rotation being parallel to each other and with the first and second axes of rotation, and in which the rocker element and the connecting rod together form the toggle, in which the toggle is configured to move between an unlocked configuration in which the third axis of rotation is located on a first side of the plane formed by the second and fourth axes of rotation and the clamp is in the open position, and a locked configuration in which the third axis of rotation is located on a second side of said plane and the clamp is in the closed position.

Preferably, the clamp comprises a locking device configured to lock the toggle in the locked configuration.

Preferably, the locking device comprises
- a stop of the connecting rod configured to come into contact with the rocker element(s), when the toggle is in the locked configuration, or a protrusion of the jaw configured to come into contact with the connecting rod when the toggle is in the locked configuration.

Preferably, the body extends along a longitudinal axis, the jaw is rotationally hinged relative to the body around a first axis of rotation perpendicular to the longitudinal axis, and the pusher element is configured to move in translation along the longitudinal axis relative to the body of the clamp.

Preferably, the movement device also comprises a lever element rotationally hinged relative to the connecting rod around the third axis of rotation, on the one hand, and relative to the pusher element around a fifth axis of rotation, parallel with the first axis of rotation.

Preferably, the body and the jaw each comprise a gripping part arranged facing each other and configured to clamp the first leaflet of the heart valve, for example the posterior leaflet of a mitral valve, when the clamp is in the closed position, and in which the pusher element is further configured to move in translation along the longitudinal axis by sliding against one face of the body, opposite to the gripping part of the jaw.

Preferably, the body extends along a longitudinal axis and the pusher element is provided with an opening extending along the longitudinal axis and configured to cooperate with the distal end of the rod.

Preferably, the body comprises a guide element configured to guide a translation of the distal end of the rod along the longitudinal axis.

Preferably, the guide element extends from the face of the body opposite the gripping part of the jaw and comprises an opening coaxial with and facing the opening of the pusher element, said opening of the guide element being configured to slidably accommodate the distal end of the rod.

Preferably, the body and the jaw each comprise a gripping part arranged facing each other and configured to clamp the first leaflet of the heart valve, for example the posterior leaflet of a mitral valve, when the clamp is in the closed position, and in which the gripping part of the body or jaw comprises a plurality of spikes configured to be implanted in the first leaflet, when the jaw clamps the first leaflet.

Preferably, at least one opening is arranged in the gripping part of the jaw or the body, facing the spikes of the body.

According to a second aspect of the invention, an assembly is also proposed, comprising the implant for a heart valve according to the first aspect of the invention and a rod whose distal end is configured to cooperate with the pusher element of the implant, so as to open and close said clamp.

Preferably, this assembly further comprises a main catheter configured to accommodate the implant and the rod.

PRESENTATION OF THE FIGURES

Other characteristics, goals and advantages of the invention will appear from the following description, which is purely illustrative and non-limiting and should be read with regard to the attached drawings, in which:

FIG. 4 is a perspective view of an implant for the mitral valve of a patient with mitral regurgitation according to one embodiment of the invention;

FIG. 6 is a perspective exploded view of the implant illustrated in FIG. 4;

Figure 7:
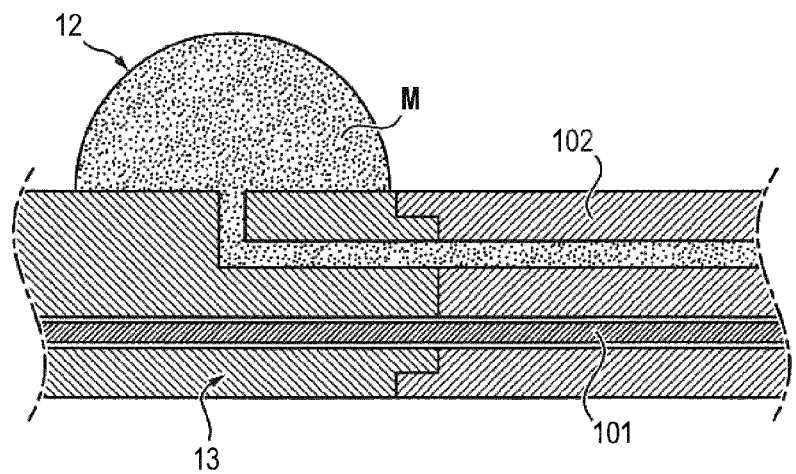
Figure 8:
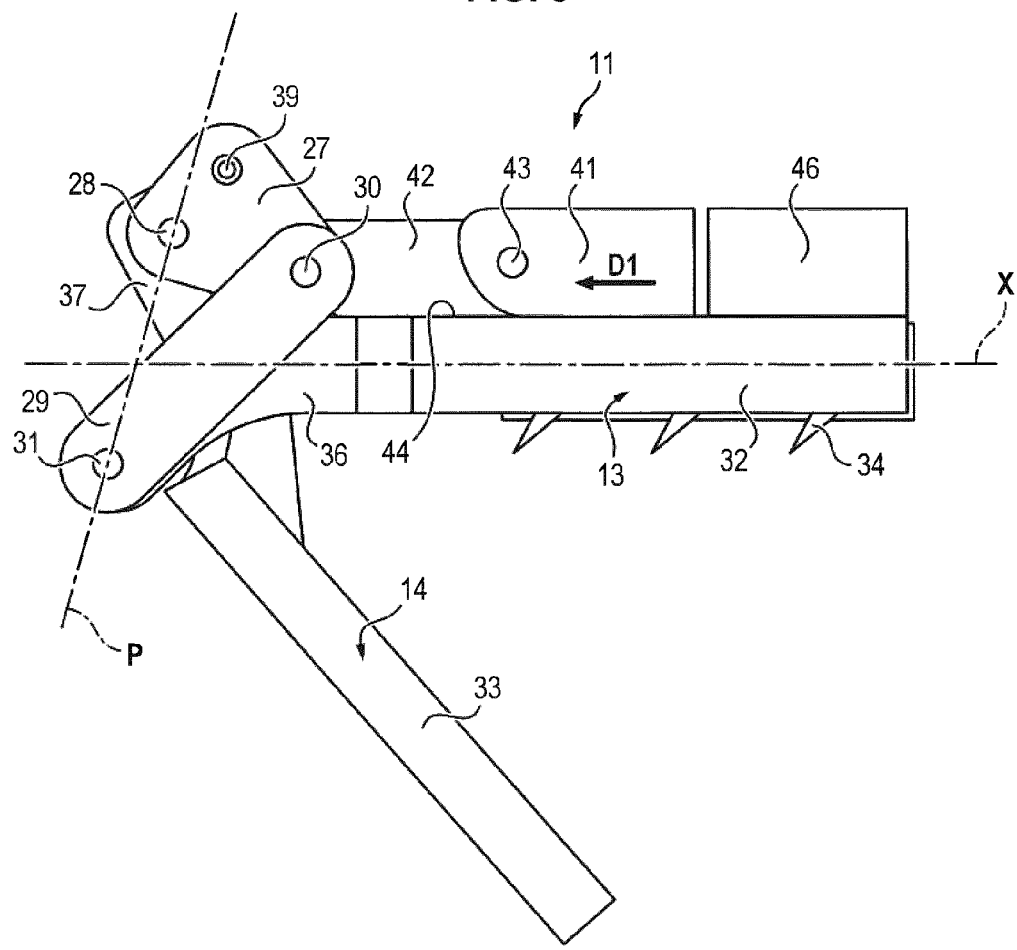
Figure 9:
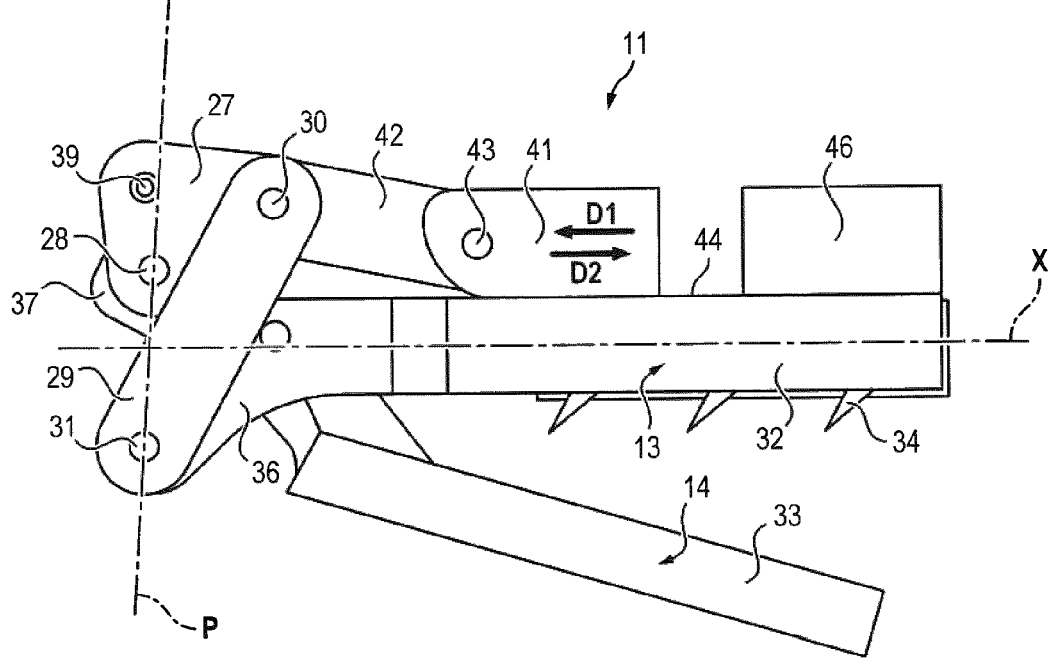
Figure 10A:
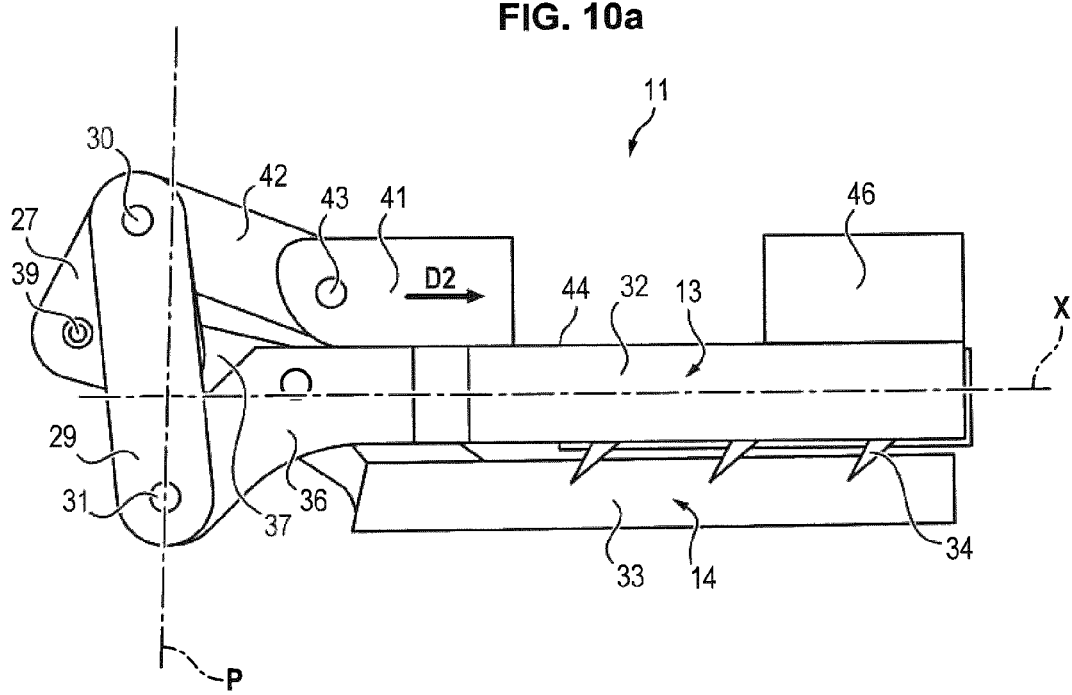
Figure 10B:
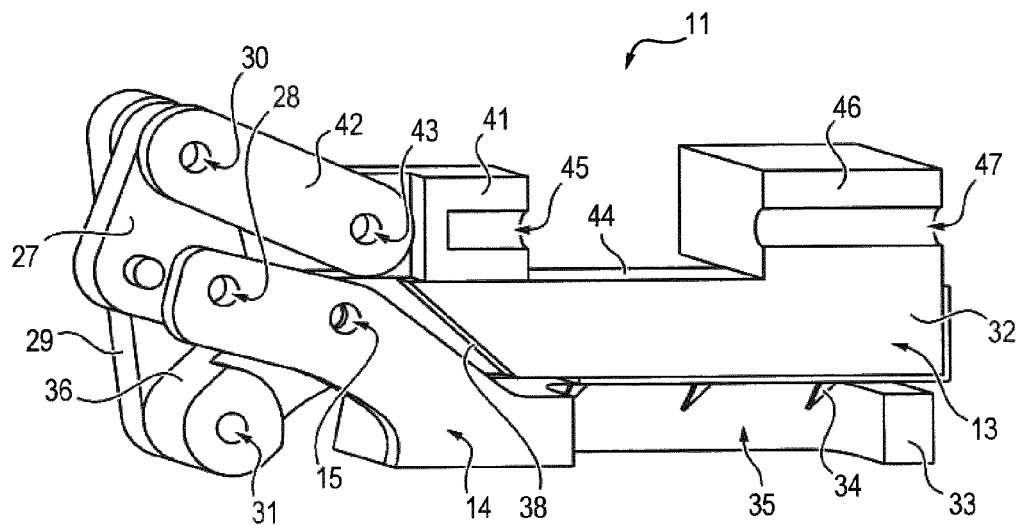
Figure 11:
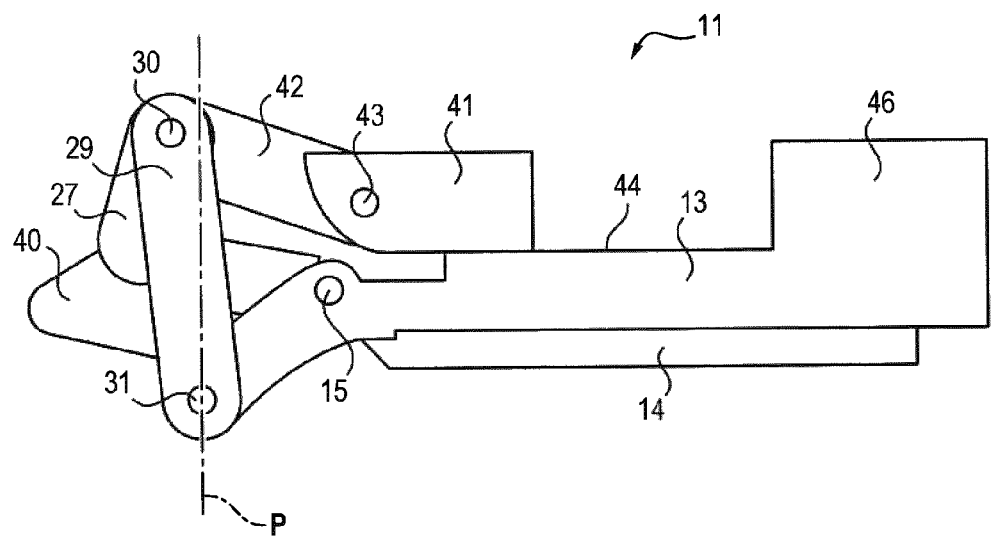
Figure 12:
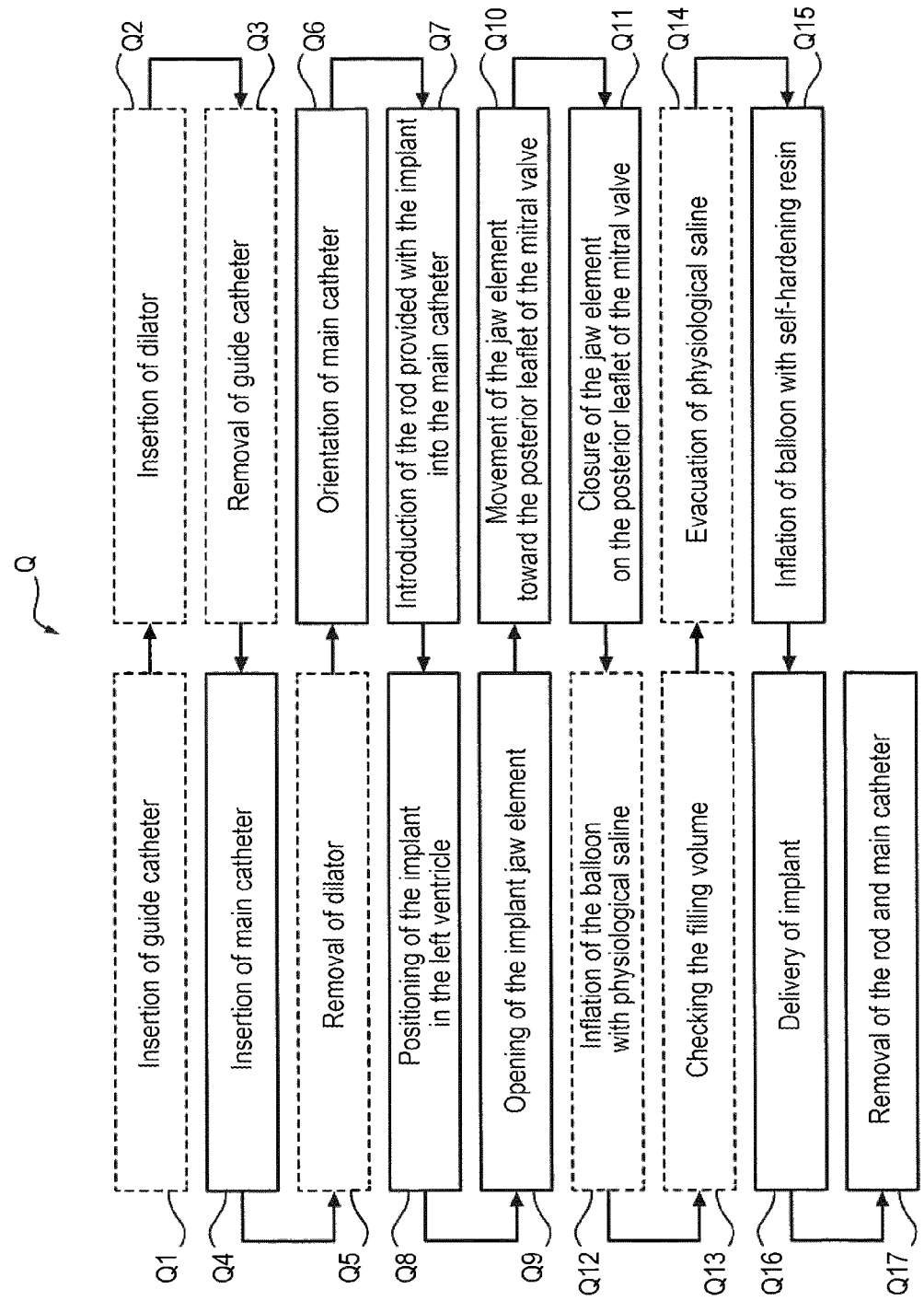
Figure 15:
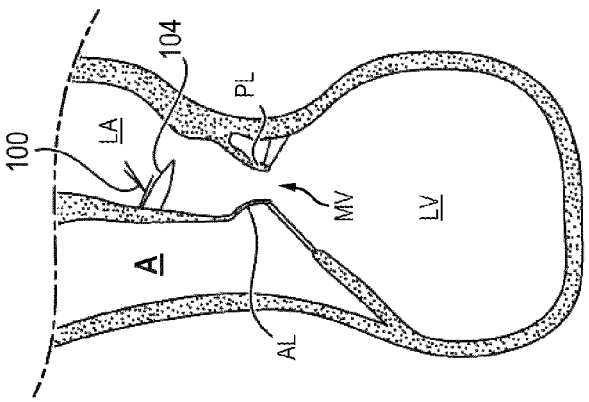
Figure 14:
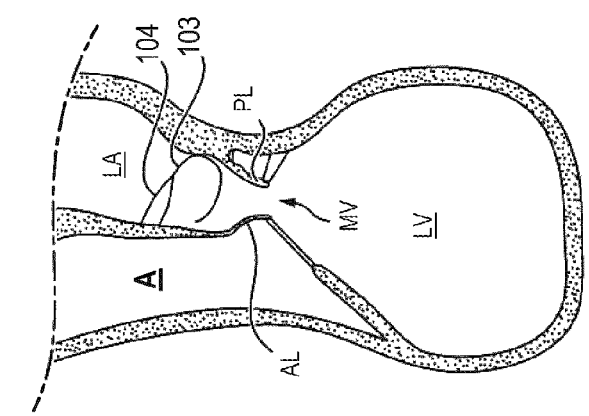
Figure 13:
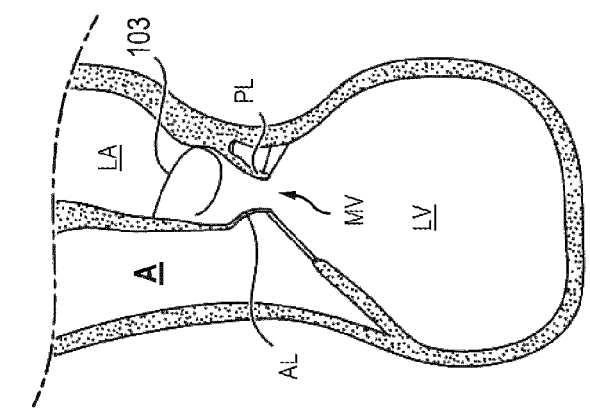
Figure 16:
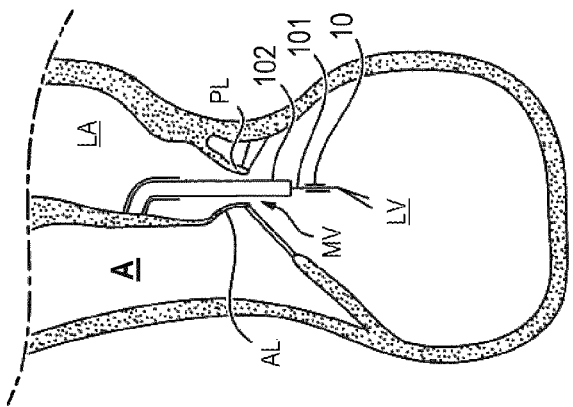
Figure 17:
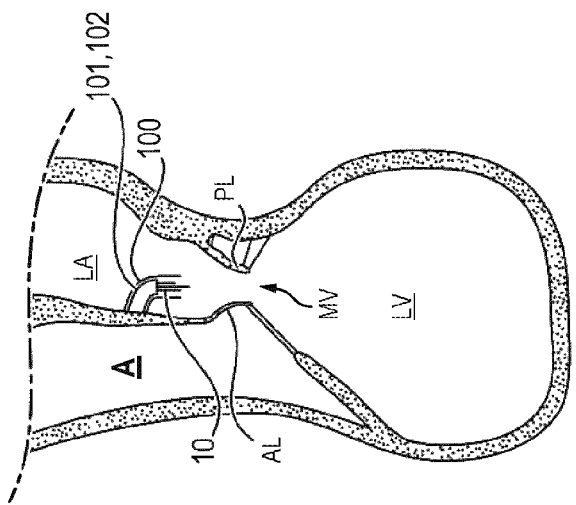
Figure 18:
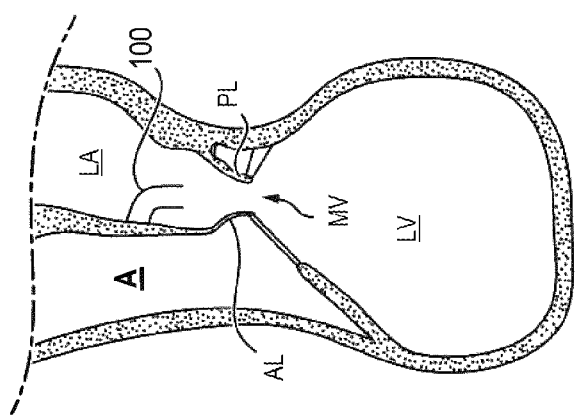
Figure 21:
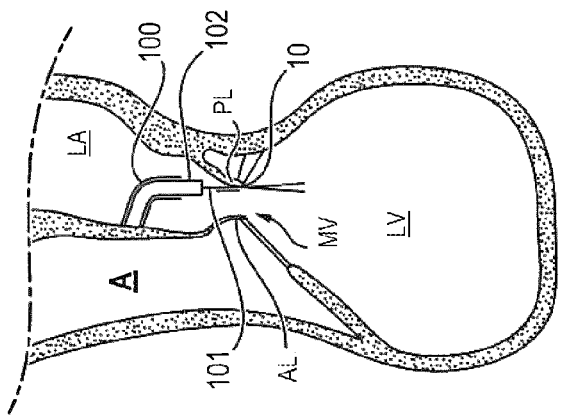
Figure 20:
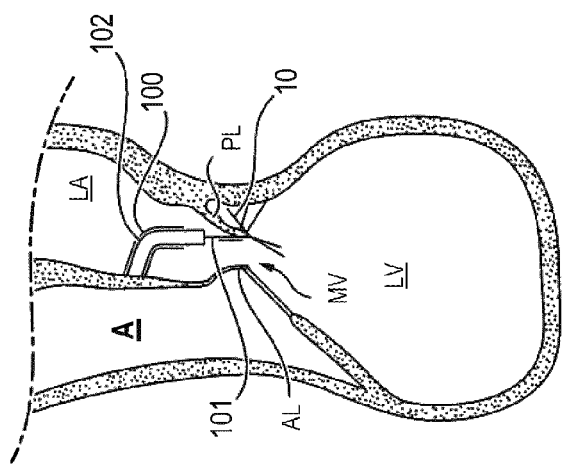
Figure 19:
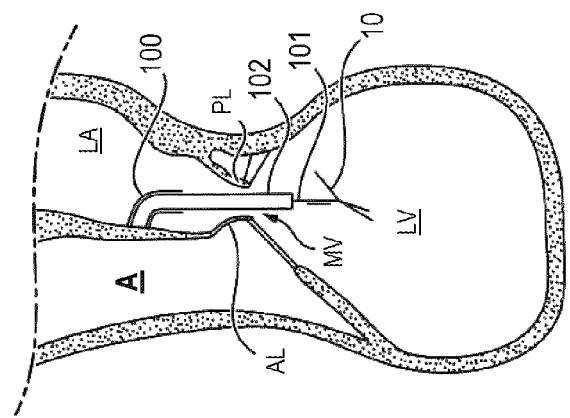
Figure 24:
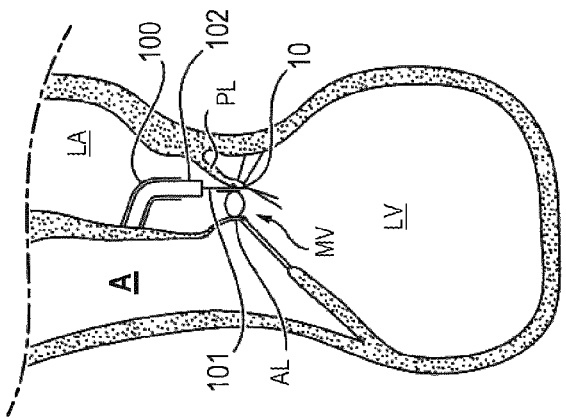
Figure 23:
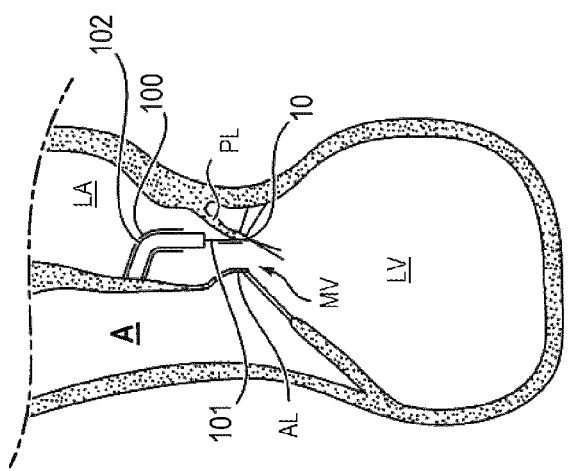
Figure 22:
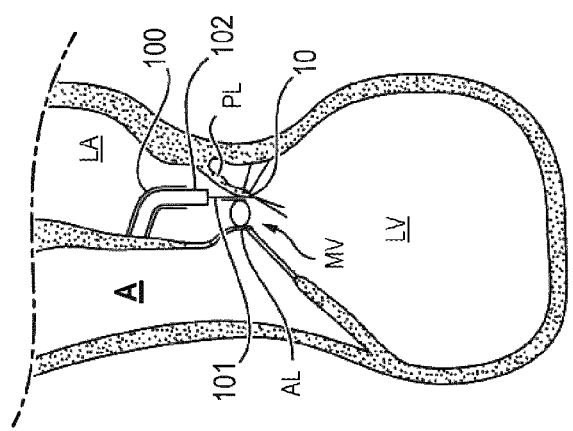
Figure 25:
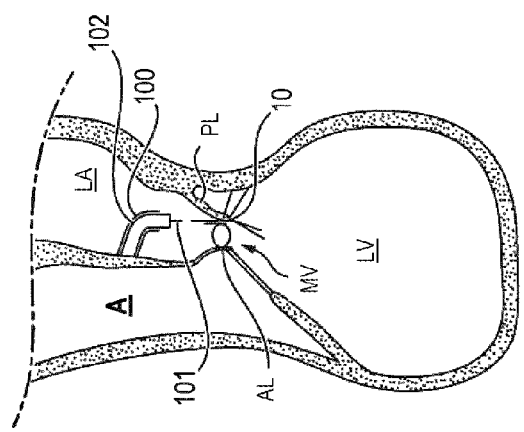

FIG. 7 schematically shows an inflation step of the balloon;

FIG. 8 is a perspective view of one example of a clamp of the implant illustrated in FIG. 4 in an open position;

FIG. 9 is a profile view of one example of a clamp illustrated in FIG. 8 in an intermediate position;

FIG. 10a is a profile view of the clamp illustrated in FIGS. 8 and 9 in a closed position;

FIG. 10b is a longitudinal sectional and perspective view of the clamp illustrated in FIG. 10a, FIG. 11 is a profile view of an example of the clamp other than the one shown in FIGS. 8 to 10a-b, in the closed position;

FIG. 12 is a flow chart of a method for positioning the implant illustrated in FIG. 4 transseptally, according to one embodiment of the invention;

FIG. 13 is a sagittal sectional and schematic view of the left side of a patient's heart during a first step of the method illustrated in FIG. 12;

FIG. 14 is a sagittal sectional and schematic view of the left side of a patient's heart during a second step of the method illustrated in FIG. 12;

FIG. 15 is a sagittal sectional and schematic view of the left side of a patient's heart during a fourth step of the method illustrated in FIG. 12;

FIG. 16 is a sagittal sectional and schematic view of the left side of a patient's heart during a sixth step of the method illustrated in FIG. 12;

FIG. 17 is a sagittal sectional and schematic view of the left side of a patient's heart during a seventh step of the method illustrated in FIG. 12;

FIG. 18 is a sagittal sectional and schematic view of the left side of a patient's heart during an eighth step of the method illustrated in FIG. 12;

FIG. 19 is a sagittal sectional and schematic view of the left side of a patient's heart during a ninth step of the method illustrated in FIG. 12;

FIG. 20 is a sagittal sectional and schematic view of the left side of a patient's heart during a tenth step of the method illustrated in FIG. 12;

FIG. 21 is a sagittal sectional and schematic view of the left side of a patient's heart during an eleventh step of the method illustrated in FIG. 12;

FIG. 22 is a sagittal sectional and schematic view of the left side of a patient's heart during systole, during a twelfth step of the method illustrated in FIG. 12;

FIG. 23 is a sagittal sectional and schematic view of the left side of a patient's heart during a fourteenth step of the method illustrated in FIG. 12;

FIG. 24 is a sagittal sectional and schematic view of the left side of a patient's heart during systole, during a fifteenth step of the method illustrated in FIG. 12;

FIG. 25 is a sagittal sectional and schematic view of the left side of a patient's heart during systole, during a sixteenth step of the method illustrated in FIG. 12;

DETAILED DESCRIPTION OF ONE EMBODIMENT

Figure 1:
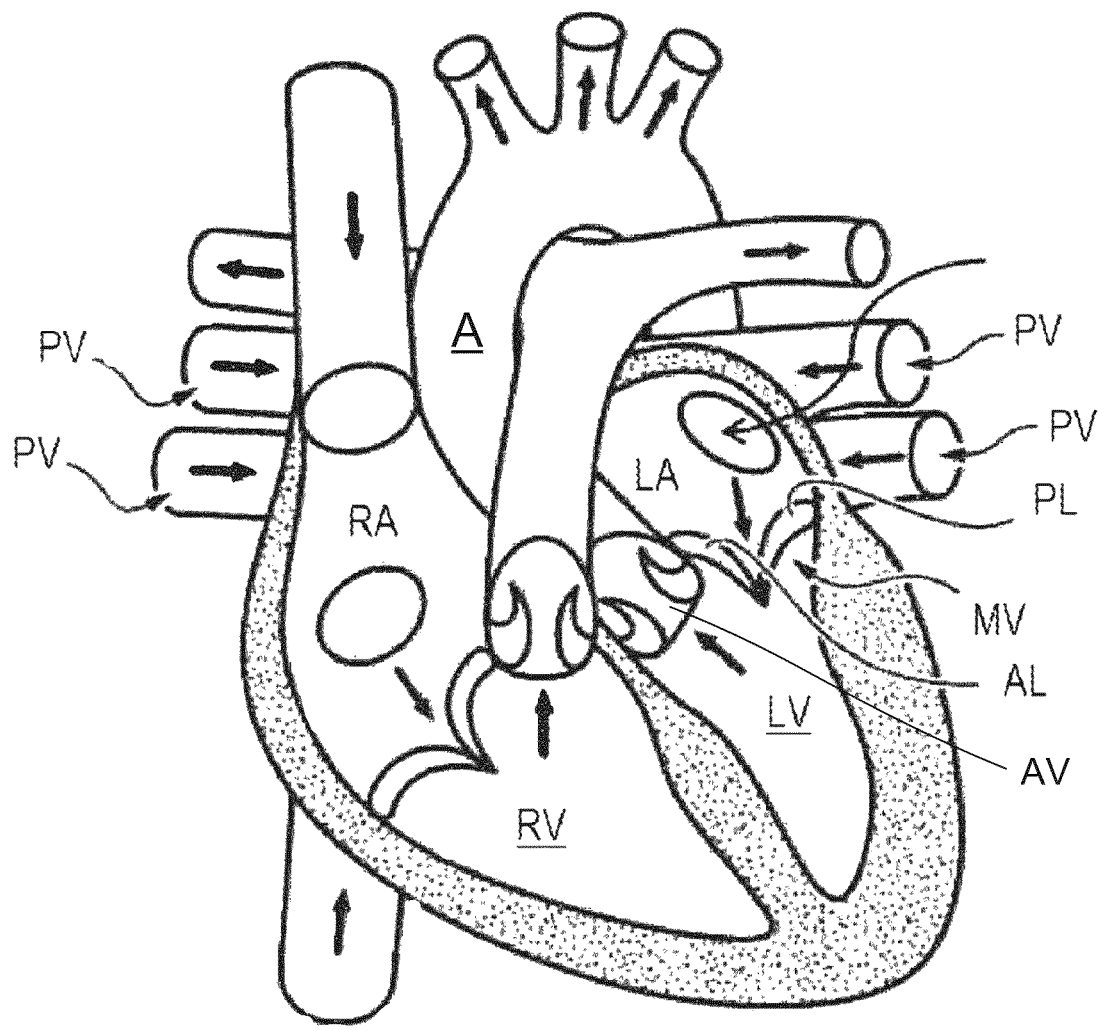
FIG. 1 (already described) is a sagittal sectional and schematic view of the patient's heart, showing the positioning of a mitral valve and the three other heart valves.
Figure 2A:
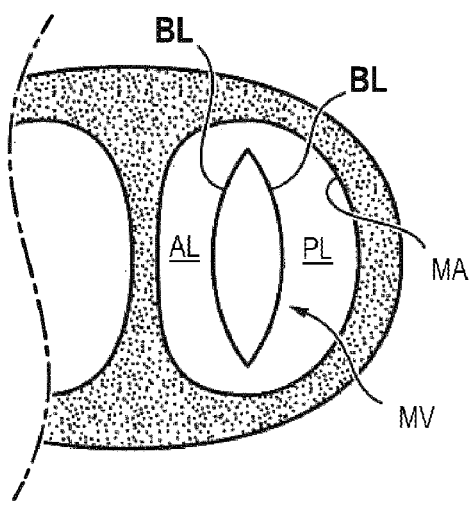
FIGS. 2a and 2b (already described) are top views of a patient's healthy mitral valve, respectively during diastole and during systole.
Figure 2B:
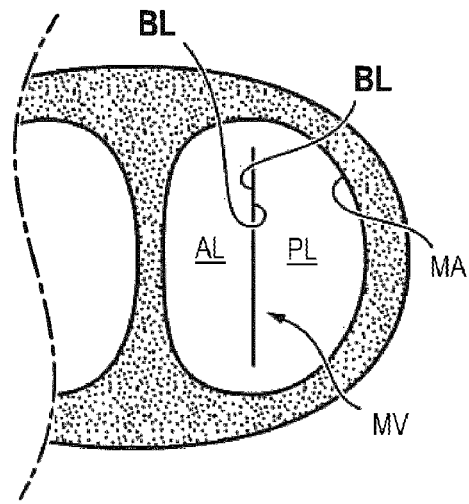
Figure 3A:
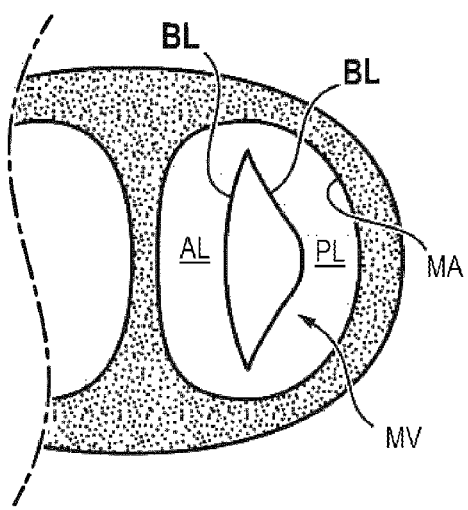
FIGS. 3a and 3b (already described) are top views of a mitral valve of a patient with mitral regurgitation, respectively during diastole and during systole.
Figure 3B:
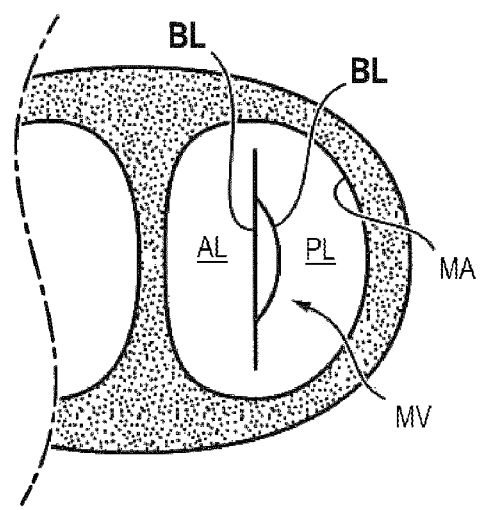

As described previously, FIGS. 3a and 3b illustrate the mitral valve MV of a patient with mitral regurgitation, respectively during diastole and during systole. During diastole, the anterior and posterior leaflets AL and PL of the mitral valve MV together define an opening O allowing blood to flow from the left atrium LA to the left ventricle LV. The mitral valve MV is then open. During systole, the anterior and posterior leaflets AL and PL of the mitral valve MV only partially come into contact with one another, so that a portion O1 of the opening O remains. The mitral valve MV is therefore only partially closed, inducing a reflux of blood from the left ventricle LV to the left atrium LA.

FIG. 4 schematically shows an implant 10 for a mitral valve MV of a patient with mitral regurgitation according to one possible embodiment of the invention.

The implant 10 comprises a clamp 11 and a balloon 12 attached to said clamp 11.

The clamp 11 comprises a body 13 extending along a longitudinal axis X and a jaw 14 rotationally hinged with respect to the body 13 around a first axis of rotation 15 perpendicular to the longitudinal axis X. The jaw 14 of the clamp 11 is configured to pivot around the first axis of rotation 15 relative to the body 13 between an open position and a closed position in which the body 13 and the jaw 14 of the clamp 11 are able to clamp one of the leaflets (for example leaflet posterior PL) of the mitral valve MV, thus attaching the implant 10 to said leaflet.

The balloon 12 is configured to close at least partially the open portion O1 remaining between the posterior leaflet PL and anterior leaflet AL of the mitral valve MV during systole, after the implant 10 has been attached to said leaflet, so as to limit the reflux of blood occurring through the open portion O1 of the mitral valve MV during systole.

The implant is more likely to be attached to the posterior leaflet PL because the stability of the implant will probably be better than if it is attached to the anterior leaflet AL.

The implant 10 is configured to be able to be inserted into a main catheter 100, so as to be implanted percutaneously or transthoracically. When the implant 10 is implanted percutaneously, the main catheter is inserted, for example, into the femoral vein at the groin fold and conveyed transseptally (through the interatrial septum: the membrane that separates the left atrium LA from the right atrium RA) to the left ventricle LV and then to the mitral valve MV. When the implant 10 is implanted transthoracically, the main catheter 100 is inserted at the spike of the left ventricle LV.

The clamp 11 is configured to cooperate with the distal end of an actuator rod 101 by means of which the clamp 11 is opened and closed. The rod 101 is, for example, partially mounted inside a delivery catheter 102, the distal end of the rod 101 being arranged outside said delivery catheter 102. In a first configuration, the rod 101 is of one piece with the delivery catheter 102 and in a second configuration, the rod 101 is free to slide along the delivery catheter 102. Thus, in the first configuration, the rod 101 does not slide inside the delivery catheter 102. The rod 101 and the delivery catheter 102 therefore move in one piece. In return, in the second configuration, the rod 101 can perform back-and-forth movements by sliding inside the delivery catheter 102.

Preferably, the balloon 12 is inflatable. In this way, when the implant 10 moves along the main catheter 100 to the mitral valve MV, the balloon 12 is in the deflated state. The diameter of the main catheter 100 can thus be small and the movement of the implant 10 along said main catheter 100 is simplified. In return, once the implant 10 is attached to the posterior leaflet PL of the mitral valve MV, the balloon 12 can be inflated. In use, the balloon remains in the inflated state.

The balloon 12 is, for example, inflated by means of the rod 101. For this, the balloon 12 comprises, for example, an opening communicating with an interior space of said balloon 12. The opening is configured to communicate fluidly with a lumen provided in the rod 101. Thus, a filling material can be injected via the lumen of the rod 101 and the opening of the balloon 12 to fill the interior space of said balloon 12 and inflate it.

Firstly, before injection of the filling material, it is possible to inject physiological saline into the interior space of the balloon 12. By means of this prior step, the operator can determine the volume of filling material necessary for the balloon 12 to be inflated to sufficiently close the open portion O1 in the mitral valve MV and therefore for the reflux of blood to be significantly reduced or eliminated.

Thus, after having evacuated the physiological saline from the balloon 12, the operator can fill the balloon 12 with the determined volume of filling material.

In a second step, the filling material is injected into the interior space of the balloon 12. The filling material is preferably a biocompatible material having a density less than or around that of blood (1056 to 1066 kg/m$^3$). The filling material is, for example, a material based on self-hardening resin. Since the filling material is self-hardening, it eliminates any risk of deflation or loss of pressure inside the balloon 12 after filling.

Alternatively, the filling material can be a material having a honeycomb structure, such as a foam or a sponge. Other possible filling materials are: hyaluronic-acid based hydrogels, poly(ethylene glycol) dimethacrylates (PEGDM) or poly(ethylene glycol) urethane-dimethacrylates (PEGUDM).

FIG. 7 schematically shows an inflation step for the balloon. Filling material M is injected inside the internal cavity of the balloon 12 via an injection duct extending from the inside of the delivery catheter 102 and the body 13 of the clamp 11 to which is attached the balloon 12. The balloon 12 is preferably formed of a membrane of elastic material, airtight, biocompatible and resistant to wear. The membrane material is, for example, preferably chosen from among polyamides (particularly Nylon®), polyethylene terephthalates ("PET") or silicones.

The use of an inflatable balloon makes it possible to adjust the balloon dimensions to the extent of the mitral leak as well as the patient's morphology. The operator can actually adjust the volume of the balloon until the mitral leak disappears. The inflation of the balloon can be monitored in real time by transesophageal echocardiography (TEE).

Figure 5A:
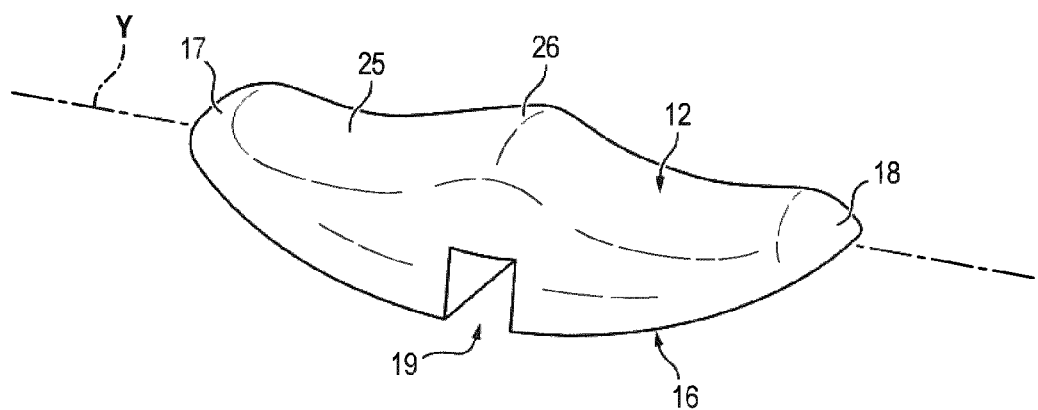
FIG. 5a is a perspective view of one example of a balloon of the implant illustrated in FIG. 4.
Figure 5B:
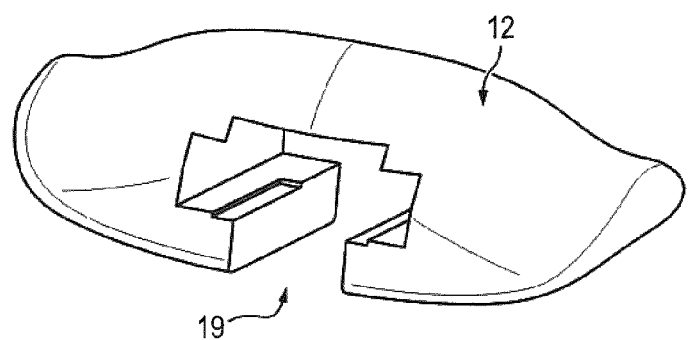
FIGS. 5b to 5e are perspective views illustrating other examples of balloons that can be part of the implant illustrated in FIG. 4.
Figure 5C:
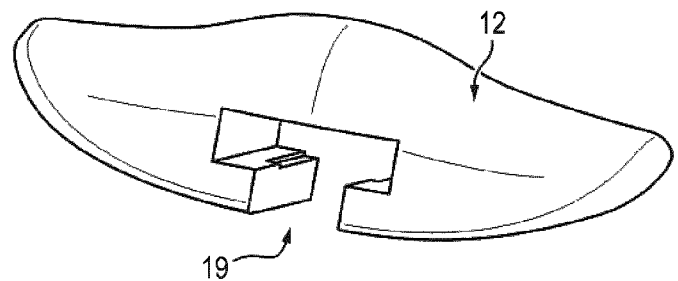
Figure 5D:
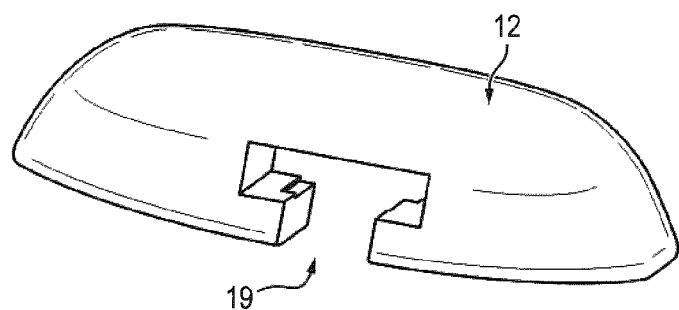
Figure 5E:
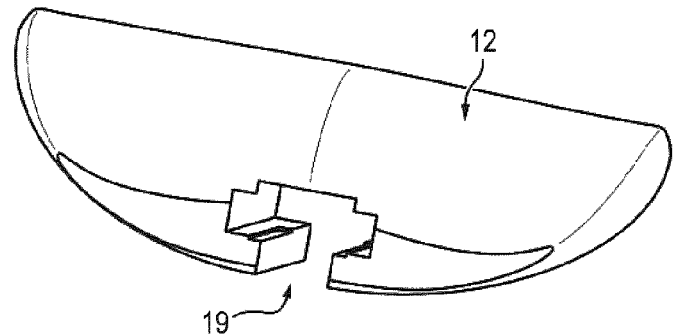

A first example of balloon 12 is illustrated in FIG. 5a.

The balloon 12 has a generally elongated shape extending along a transverse axis Y parallel to the first axis of rotation 15. Thus, the balloon 12 extends along the anterior and posterior leaflets AL and PL of the mitral valve MV when the implant 10 is attached to the posterior leaflet PL, and bests conforms to the shape of the open portion O1 remaining between the anterior and posterior leaflets AL and PL during systole, so as to close the remaining open portion O1.

More precisely, the balloon 12 has an arched (or crescent) shape overall. The balloon 12 has a first face 16 positioned facing the clamp 11, and a second face 25, opposite the first face 16. The first face 16 is, for example, convex between each of the ends 17 and 18 of the balloon 12 along the transverse axis Y. The first face 16 of the balloon 12 is able to conform to the curve of the posterior leaflet. Indeed, the "natural" coaptation line between the anterior and posterior mitral valve leaflets has a concave shape toward the left ventricular outflow tract (aortic duct). The convex shape of the balloon 12 therefore respects the morphology of the valve.

A groove 19 can further be provided in the first face 16 of the balloon 12 along the longitudinal axis X to accommodate the clamp 11 and particularly the body 13. Preferably, the groove 19 goes from one side of the balloon 12 to the other.

The second face 25 of the balloon 12 can have an excess thickness 26 generally provided at mid-distance between the transverse ends 17 and 18 of the balloon 12. Thus, the balloon 12 best conforms to the shape of the open portion O1 remaining between the anterior and posterior leaflets AL and PL during systole. The closure of the open portion O1 is more effective in this way.

Other examples of balloons are illustrated in FIGS. 5b to 5e.

As illustrated in FIG. 4, the implant 10 further has a support tab 20 by means of which the balloon 12 is attached to the clamp 11. According to one possible embodiment, the balloon 12 can be attached to the support tab 20, for example by sewing, welding, gluing or after dipping, and the support tab 20 is in turn attached to the clamp 11.

In FIG. 4, the support tab 20 extends along the transverse axis Y. The support tab 20 has a first face 21 attached to the first face 16 of the balloon 12 and a second face 22, opposite the first face 21.

The support tab 20 is formed of a shape memory material, having the shape of a grid, for example. A shape memory material is a material that has the ability to remember an initial shape and return to this initial shape after deformation. Thus, a shape memory material has, for example, a first shape in a first temperature range below a critical temperature Tc and a second shape in a second temperature range above critical temperature Tc. The temperature variations around the critical temperature Tc thus make it possible to vary the shape of the material. The shape memory material is chosen so as to have a critical temperature comprised between 20° C. and 37° C.

In a first shape state, the support tab 20 is, for example, folded back on itself. In this first shape state, the balloon 12 is deflated. The support tab 20 thus makes it possible to limit the volume of the implant 10 when it is conveyed to the patient's heart inside the main catheter 100. The support tab 20 is found in the first shape state when its temperature is located in a first temperature range below the critical temperature Tc of the material. The support tab 20 is found in the first shape state when the support tab 20 is at a temperature below the critical temperature, particularly when it is immersed in an ambient medium, such as ambient air, with a temperature of approximately 20° C.

In a second shape state, the support tab 20 is deployed. In the deployed state, the first face 21 of the support tab 20 is concave between each of its ends 23 and 24 along the transverse axis Y. The support tab 20 thus gives the first face 16 of the balloon 12 its convex shape. In this second shape state, the balloon 12 can be inflated to close the open portion O1 of the mitral valve MV remaining open during systole. The support tab 20 is found in the second shape state when the temperature of the support tab 20 is above the critical temperature, particularly when it is immersed in an ambient medium, such as blood, with a temperature of approximately 37° C.

The temperature of the support tab 20 automatically varies when the support tab 20 comes into contact with blood. When the temperature of the medium in which the support tab 20 is immersed changes, the support tab 20 changes shape and goes from the first shape state (folded) to the second shape state (deployed).

Preferably, the support tab 20 is made of Nitinol. Nitinol is a nickel and titanium alloy. Once in contact with blood at 37° C., the support tab 20 goes from the folded state to the deployed state. Making the support tab 20 out of Nitinol is particularly advantageous. Indeed, Nitinol is biocompatible and hemocompatible. Moreover, it has very good corrosion resistance and is hyperelastic.

FIGS. 5b to 5e schematically illustrate other examples of balloons that can be part of the implant illustrated in FIG. 4.

FIGS. 7 and 10a-b respectively show the clamp 11 in the open position and the closed position. FIG. 8 shows the clamp 11 in an intermediate position between the open and closed positions.

The clamp 11 has a rotation drive device 27 configured to rotate the jaw 14 relative to the body 13 around the first axis of rotation 15 between the open position and the closed position.

The rotation drive device 27 comprises, for example, a connecting rod rotationally hinged with the jaw 14 around a second axis of rotation 28. The second axis of rotation 28 is parallel and not coincident with the first axis of rotation 15. The movement of the connecting rod 27 thus pivots the jaw 14 relative to the body 13 around the first axis of rotation 15 between the open position and the closed position.

The clamp 11 can also comprise a locking device 27, 29 configured to lock the clamp 11 in the closed position. Locking the clamp 11 in closed position reduces the risk of untimely opening of the clamp 11 once the implant 10 is attached to the posterior leaflet PL of the mitral valve MV.

FIGS. 10a and 10b show the clamp 11 in a closed and locked position.

The clamp 11 comprises, for example, at least one rocker element 29 articulated in rotation with the connecting rod 27 around a third axis of rotation 30, on the one hand, and with the body 13 of the clamp 11 around a fourth axis of rotation 31, on the other hand. The third and fourth axes of rotation 30, 31 are parallel and not coincident with one another and with the first and second axes of rotation 15, 28.

The rocker element 29 and the connecting rod 27 together form a toggle. The toggle is configured to move between an unlocked configuration in which the third axis of rotation 30 is located on a first side of plane P formed by the second and fourth axes of rotation 28, 31, the clamp 11 then being in the open position, and a locked configuration in which the third axis of rotation 30 is located on a second side of said plane P, the clamp 11 then being in the closed position.

The clamp 11 comprises, for example, two rocker elements 29 positioned on either side of the body 13 and the connecting rod 27.

The body 13 and the jaw 14 comprise respective gripping parts 32, 33. The gripping parts 32, 33 of the body 13 and the jaw 14 are arranged facing each other and are configured to clamp the posterior leaflet PL of the mitral valve MV, when the clamp 11 is in the closed position.

The gripping part 32 of the body 13 accommodates the balloon 12. For this, the gripping part 32 of the body 13 is inserted, for example, into the groove 19 provided for this purpose in the first face of the balloon 12.

The gripping part 32 of the body 13 may further have a plurality of spikes 34 configured to implant into the posterior leaflet PL of the mitral valve MV when the clamp 11 clamps the posterior leaflet PL of the mitral valve. The spikes 34 thus improve the grip of the clamp 11 on the posterior leaflet PL of the mitral valve MV.

The spikes 34 extend, for example, perpendicularly overall from one face of said gripping part 32 of the body 13 facing the jaw 14. For this, a plate provided with the spikes 34 is attached to the face of the gripping part 32 of the body 13 facing the jaw 14.

Preferably, one or more through openings 35 are provided in the gripping part 33 of the jaw 14 facing the spikes 34 of the body 13. The opening(s) 35 are configured to accommodate the spikes 34 of the body 13 when the clamp 11 is in the closed position. Thus, it is ensured that the closure of the clamp 11 is not hindered by the spikes 34 of the body 13. The opening(s) 35 can be replaced by one or more recesses.

Alternatively, the spikes 34 are supported by the gripping part 33 of the jaw 14, for example by means of the plate, and, as applicable, the opening(s) 35 are provided in the gripping part 32 of the body 13.

The body 13 and the jaw 14 each have an actuator part 36, 37 respectively accommodating the first and fourth axes of rotation 15 and 31 and the first and second axes of rotation 15 and 28. The actuator parts 36 and 37 of the body 13 and the jaw 14 are arranged facing each other.

The first axis of rotation 15 is, for example, located in the actuator part 36 of the body 13 between the gripping part 32 of said body 13 and the fourth axis of rotation 31.

The first axis of rotation 15 is, for example, located in the actuator part 37 of the jaw 14 between the gripping part 33 of said jaw 14 and the second axis of rotation 28.

The second axis of rotation 28 is, for example, positioned on a side opposite the gripping part 33 of the jaw 14, while the fourth axis of rotation 31 is positioned on a side opposite the gripping part 32 of the body 13.

For this, a through opening 38 is provided, for example in the actuator part 36 of the body 13 to accommodate the actuator part 37 of the jaw 14 and allow the second axis of rotation 28 to be located on a side opposite the gripping part 33 of the jaw 14. The body 13 and the jaw 14 thus intersect at the first axis of rotation 15.

The clamp 11 can further comprise a locking device 39, 40 configured to lock the toggle 27, 29 in the closed position. Locking the clamp 11 in closed and locked position further reduces the risk of untimely opening of the clamp 11 once the implant 10 is attached to the posterior leaflet PL of the mitral valve MV.

For this, the connecting rod 27 comprises, for example, a stop 39 configured to come into contact with the rocker element(s) 29 in the locked configuration of the toggle. The stop 39 is, for example, formed by an axis parallel to the second and third axes of rotation 18 and 20. An example of the clamp 11 with the stop 39 is shown in FIGS. 7 to 9.

As a variant, the jaw 14 comprises a protrusion 40 extending from the actuator part 37 of the jaw 14 and configured to come into contact with the connector rod 27 in the locked configuration of the toggle. The clamp 11 with the protrusion 40 is illustrated in FIG. 11.

The clamp 11 can further comprise a movement device 41, 42 configured to move the connecting rod 27 and thus cause the jaw 14 to pivot relative to the body 13 around the first axis of rotation 15 between the open position and the closed position.

The movement device 41, 42 comprises, for example, a pusher element 41 configured to move in translation along the longitudinal axis X relative to the body 13 of the clamp 11, and a lever element 42 rotationally hinged relative to the connecting rod 27 around the third axis of rotation 30, on the one hand and relative to the pusher element 41 around a fifth axis of rotation 43. The fifth axis of rotation 43 is parallel and not coincident with the first, second, third and fourth axes of rotation 15, 28, 30 and 31.

Thus, when the pusher element 41 is moved in translation along the longitudinal axis X relative to the body 13, it causes the movement of the third axis of rotation 30 by means of the lever element 42. When the pusher element 41 is moved in a first direction D1, the jaw 14 pivots around the first axis of rotation 15 to the clamped position CP and the third axis of rotation 30 is driven to the locked position. When the pusher element 41 is moved in a second direction D2, opposite the first direction D1, the jaw 14 pivots around the first axis of rotation 15 to the separated position and the third axis of rotation 30 is driven to the locked position.

Preferably, the pusher element 41 is configured to move in translation along the longitudinal axis X by sliding against a face 44 of the body 13, opposite the gripping part 33 of the jaw 14. Thus, the movement of the pusher element 41 is guided by the body 13.

The pusher element 41 is, for example, provided with an opening 45 extending along the longitudinal axis X. The opening 45 is configured to cooperate with the distal end of the rod 101. Thus, the operator manipulates the proximal end of the rod 101 to move the pusher element 41 and therefore active the opening and closing of the clamp 11, and, as applicable, locking thereof. An example of opening 45 with the pusher element 41 is illustrated FIG. 10b.

The body 13 can further comprises a guide element 46 configured to guide the translation of the distal end of the rod 101 along the longitudinal axis X.

The guide element 46 extends, for example, from the face 44 of the body 13 opposite the gripping part 33 of the jaw 24 and comprises a through opening 47 extending along the longitudinal axis X and configured to slidably accommodate the distal end of the rod 101. The opening 47 of the guide element 46 and the opening 45 of the pusher element 40 are coaxial and arranged facing one another. The opening 47 thus guides the translational movement of the distal end of the rod 101 along the longitudinal axis X which can then the drive pusher element 41 in translation along said longitudinal axis X and thus open and close the clamp 11. An example of opening 47 with the guide element 34 is illustrated FIG. 10b.

The clamp 11 is, for example, covered with a Dacron® coating. This material promotes endothelialization (colonization of tissue by endothelial cells) of the implant, which improves its hold at the implantation site and reduces the risk of thrombus formation (blockage of a blood vessel). In other words, the clamp 11 is made of titanium, for example, and covered with a thin layer of Dacron®. As a variation, the clamp 11 is made of a chromium and cobalt alloy.

FIG. 12 is a diagram illustrating different steps of a method P for positioning the implant 10 transseptally by way of example.

In a first step Q1, a guide 103 is inserted into the femoral vein, to the right atrium RA and then a trans-septal catheterization is performed (through the interatrial septum) up to the left atrium LA and the mitral annulus MA. The first step Q1 is illustrated in FIG. 13.

In a second step Q2, a dilator 104 is threaded over the guide 103, which in turn is inserted to the left atrium LA. The dilator 104 is thus guided by the guide 103 to the left atrium LA. The dilator 104 dilates the tissues of the interatrial septum allowing the main catheter 100 to be inserted. The second step Q2 is illustrated in FIG. 14.

In a third step Q3, the catheter guide 103 is removed.

In a fourth step Q4, the main catheter 100 is inserted in turn over the guide, through the interatrial septum to the left ventricle LA. For this, the main catheter 100 is threaded around the dilator 104, for example. The fourth step Q4 is illustrated in FIG. 15.

In a fifth step Q5, the dilator 104 is removed.

In a sixth step Q6, the distal end 105 of the main catheter 100 is oriented so as to extend in a generally coaxial manner with the mitral annulus MA. The distal end 105 of the main catheter 100 thus comprises a part that can be oriented. The sixth step Q6 is illustrated in FIG. 16.

In a seventh step Q7, the rod 101, the distal end of which cooperates with the implant 10, and, as applicable, the delivery catheter 102, are introduced into the main catheter 100. The rod 101 and the delivery catheter 102 are then in the first configuration in which the rod 101 and the delivery catheter 102 move as one piece. The clamp 11 is in the closed position. The balloon 12 is in the deflated state and, as applicable, the support tab 20 is in the first shape state. The seventh step Q7 is illustrated in FIG. 17.

In an eighth step Q8, the distal end of the rod 101 and, as applicable, that of the delivery catheter 102 leave the main catheter 100 and cross through the mitral valve MV until the distal end of the delivery catheter 102 is positioned in the left ventricle LV. The balloon 12 of the implant 10 is then oriented toward the anterior leaflet AL of the mitral valve MV, while the jaw 14 of the clamp 11 is oriented toward the posterior leaflet PL of the mitral valve MV. The clamp 11 is still in the closed position. The balloon 12 is in the deflated state and, as applicable, in contact with the blood, the support tab 20 goes from the first shape state (folded) to the second shape state (deployed). The eighth step Q8 is illustrated in FIG. 18.

In ninth step Q9, the clamp 11 is opened. For this, the rod 101, for example, the pulls pusher element 41 toward the end of the body 13 carrying the balloon 12. The rod 101 and the rod guide 102 are then in the second configuration, in which the rod 101 is free to slide inside the rod guide 102. The ninth step Q9 is illustrated in FIG. 19.

In a tenth step Q10, the rod 101 and, as applicable, the delivery catheter 102 move towards the mitral valve MV so that the posterior leaflet PL of the mitral valve MV is positioned between the body 13 and the jaw 14 of the clamp 11 still open. The rod 101 and the delivery catheter 102 are then in the first configuration in which the rod 101 and the delivery catheter 102 move as one piece. The tenth step Q10 is illustrated in FIG. 20.

In an eleventh step Q11, the clamp 11 is closed and, as applicable, locked. The implant 10 is thus attached to the posterior leaflet PL of the mitral valve MV. For this, the rod 101 pushes, for example, the pusher element 41 downstream in the direction of the apex of the body 13 of the implant 10 opposite the balloon 12. The rod 101 and the delivery catheter 102 are then in the second configuration, in which the rod 101 is free to slide inside the delivery catheter 102. The eleventh step Q11 is illustrated in FIG. 21.

In a twelfth step Q12, the balloon 12 is inflated with physiological saline, and the volume of physiological saline filling the balloon 12 is determined. The twelfth step Q12 is illustrated in FIG. 22.

In a thirteenth step Q13, the effect of inflating the balloon 12 to the determined filling volume is checked by injection of physiological saline into the cavity of the balloon 12. For this, the operator sees if the reflux of blood is sufficiently reduced by means of transesophageal echocardiography (TEE). If the filling volume determined is deemed satisfactory, the determined filling volume is validated. Otherwise, the filling volume is adjusted and then checked again.

In an optional fourteenth step Q14, the physiological saline is removed from the balloon 12. The fourteenth step Q14 is illustrated in FIG. 23.

In a fifteenth step Q15, the balloon 12 is inflated with a filling material. The volume of filling material injected into the balloon 12 corresponds, for example, to the filling volume determined in the twelfth step Q12. The fifteenth step Q15 is illustrated in FIG. 24.

In sixteenth step Q16, the implant 10 is released. For this, the rod 101 is disconnected from the pusher element 41, for example. The sixteenth step Q16 preferably takes place once the resin is hardened. The sixteenth step Q16 is illustrated in FIG. 25.

In a seventeenth step Q17, the rod 101, the delivery catheter 102, as applicable, and the main catheter 100 are removed from the patient's body.

All these steps can be performed with monitoring by cardiac fluoroscopy control and transesophageal echocardiography (TEE).

The method Q for positioning the implant 10 percutaneously is particularly advantageous since it has reduced risks for the patient compared to an open heart operation.

The implant and method as described previously are not only intended for positioning on a mitral valve. The proposed implant can also be positioned on heart valves other than the mitral valve, in particular the other atrioventricular valve, i.e., the tricuspid valve.

The invention claimed is:

1. Implant for a heart valve comprising two leaflets, the implant comprising:
   a clamp comprising a body and a jaw rotationally hinged with the body to pivot between an open position and a closed position in which the body and the jaw are able to clamp a first leaflet among the two leaflets, so as to attach the implant onto the first leaflet,
   a movement device comprising a pusher element, the movement device being configured to move the jaw relative to the body from the open position to the closed position or vice versa, when the pusher element is pushed by a rod,
   wherein the implant comprises a balloon attached to the clamp and configured to close at least partially an open portion remaining between the heart valve leaflets during systole, when the implant is attached to the first leaflet, so as to limit a reflux of blood through said open portion remaining during systole, wherein the clamp comprises a locking device configured to lock the clamp in the closed position, and wherein the movement device is configured to act on the locking device so that the jaw is locked in closed position when the movement device moves the jaw relative to the body into the closed position, wherein the locking device comprises a toggle and the jaw is rotationally hinged around a first axis of rotation relative to the body, and wherein the clamp comprises a connecting rod rotationally hinged with the jaw around a second axis of rotation, said second axis of rotation being parallel with the first axis of rotation, wherein the clamp comprises at least one rocker element rotationally hinged with the connecting rod around a third axis of rotation, on the one hand, and with the body of the clamp around a fourth axis of rotation, on the other hand, the third and fourth axes of rotation being parallel to each other and with the first and second axes of rotation, and wherein the rocker element and the connecting rod together form the toggle, in which the toggle is configured to move between an unlocked configuration in which the third axis of rotation is located on a first side of a plane formed by the second and fourth axes of rotation and the clamp is in the open position, and a locked configuration in which the third axis of rotation is located on a second side of said plane and the clamp is in the closed position.

2. The implant according to claim 1, configured to be inserted into a main catheter so as to be implanted percutaneously or transapically.

3. The implant according to claim 1, wherein the balloon is inflatable.

4. The implant according to claim 1, wherein the balloon has a generally elongated shape extending along a transverse axis parallel to the first axis of rotation.

5. The implant according to claim 4, wherein the balloon has a first face arranged facing the clamp, said first face being convex between ends of the balloon along the transverse axis.

6. The implant according to claim 1, comprising a support tab attached to the balloon, said support tab comprising a shape memory material exhibiting, in a first temperature range, a first shape state in which the support tab is folded back and, in a second temperature range, a second shape state in which the support tab is deployed.

7. The implant according to claim 1, wherein the body extends along a longitudinal axis, the jaw is rotationally hinged relative to the body around the first axis of rotation which is perpendicular to the longitudinal axis, and the pusher element is configured to move in translation along the longitudinal axis relative to the body of the clamp.

8. The implant according to claim 1, wherein the body extends along a longitudinal axis, and wherein the pusher element is provided with an opening extending along the longitudinal axis and configured to cooperate with a distal end of the rod.

9. The implant according to claim 1, wherein the body and the jaw comprise respective gripping parts arranged facing each other and configured to clamp the first leaflet of the heart valve, when the clamp is in the closed position, and wherein the gripping part of the body or the jaw comprises a plurality of spikes configured to be implanted in the first leaflet, when the jaw clamps the first leaflet.

10. The implant according to claim 9, wherein at least one opening is arranged in the gripping part of the jaw facing the spikes of the body, or at least one opening is arranged in the gripping part of the body, facing the spikes of jaw.

11. Assembly comprising:
an implant for a heart valve according to claim 1,
a rod having a distal end configured to cooperate with the pusher element of the implant, so as to open and close the clamp.

12. The assembly according to claim 11, further comprising a main catheter configured to accommodate the implant and the rod.

* * * * *